(12) United States Patent
Kim et al.

(10) Patent No.: US 6,918,682 B2
(45) Date of Patent: Jul. 19, 2005

(54) ILLUMINATION SYSTEM AND PROJECTION SYSTEM EMPLOYING THE SAME

(75) Inventors: Sung-ha Kim, Gyeonggi-do (KR); Soon-Cheoi Choi, Gyeonggi-do (KR); Kirill Sergeevich Sokolov, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 10/284,450

(22) Filed: Oct. 31, 2002

(65) Prior Publication Data

US 2003/0090900 A1 May 15, 2003

(30) Foreign Application Priority Data

Nov. 8, 2001 (KR) ......................................... 2001-69501

(51) Int. Cl.[7] ............................... F21V 9/00; G02B 5/32
(52) U.S. Cl. ....................... 362/231; 362/245; 362/268; 359/15
(58) Field of Search ................................. 362/231, 245, 362/244, 243, 268, 230, 237, 800; 359/15, 1, 25

(56) References Cited

U.S. PATENT DOCUMENTS

| | | | | |
|---|---|---|---|---|
| 4,535,394 A | * | 8/1985 | Dugre | ........................ 362/231 |
| 5,404,234 A | * | 4/1995 | Taniguchi et al. | ............. 359/15 |
| 6,115,152 A | | 9/2000 | Popovich et al. | .............. 359/15 |
| 6,547,421 B2 | * | 4/2003 | Sugano | ........................ 362/268 |

FOREIGN PATENT DOCUMENTS

KR 2001-22667 3/2001

* cited by examiner

*Primary Examiner*—Sandra O'Shea
*Assistant Examiner*—Bao Q. Truong
(74) *Attorney, Agent, or Firm*—Staas & Halsey LLP

(57) ABSTRACT

An illumination system capable of realizing a color image without a color wheel, and a projection system employing the illumination system. The illumination system includes first, second, and third light emitting devices and first and second hologram devices. The first, second, and third light emitting devices emit light beams having different wavelengths. The first and second hologram devices are disposed in an "X" configuration at an angle with respect to the first, second, and third light emitting devices and transmit or reflect incident light depending on the wavelength of the light. The projection system further includes a display device, and a projection lens unit. The display device processes beams incident in one direction via the first and second hologram devices, according to an input image signal, and forms an image. The projection lens unit enlarges and projects the image formed by the display device on a screen. The illumination system and the projection system can realize a wide color gamut. Thus, the illumination system and the projection system can provide a high-density and high-quality image, and can be compact by compressing the cross-sectional area of a beam.

24 Claims, 2 Drawing Sheets

ILLUMINATION SYSTEM AND PROJECTION SYSTEM EMPLOYING THE SAME

CROSS-REFERENCE TO RELATED APPLICATIONS

This application claims the benefit of Korean Application No. 2001-69501, filed Nov. 8, 2001, in the Korean Intellectual Property Office, the disclosure of which is incorporated herein by reference.

BACKGROUND OF THE INVENTION

1. Field of the Invention

The present invention relates to an illumination system and a projection system, and more particularly, to a compact illumination system, which realizes a color image without a color wheel, and a projection system employing the same.

2. Description of the Related Art

Referring to FIG. 1, a conventional projector includes a light source 100, a first relay lens 102, a color wheel 105, a fly eye lens 107, a second relay lens 110, a display device 112, and a projection lens system 115. The first relay lens 102 focuses a beam emitted from the light source 100. The color wheel 105 divides incident light into three color beams (R, G, B). The fly eye lens 107 makes uniform the beams which have passed through the color wheel 105. The second relay lens 110 focuses the beams which have passed through the fly eye lens 107. The display device 112 forms a color image using the R, G, B beams which are sequentially incident via the color wheel 105. The projection lens system 115 enlarges the color image formed by the display device 112 and projects the enlarged color image on a screen 118.

The light source 100 may be a xenon lamp, a metal-halide lamp, or an ultra high performance (UHP) lamp, all of which emit a large amount of unnecessary infrared rays and ultraviolet rays and thus generate a large amount of heat. A cooling fan (not shown) is used to cool the light source 100, but generates noise. Also, these lamps have a wide emission spectrum and thus a narrow color gamut. Thus, these lamps can emit a narrow range of colors, and have poor color purity and a short lifespan.

In a conventional projection system, a driving motor (not shown) rotates the color wheel 105 at a high speed to illuminate the display device 112 with R, G, B colors, thereby creating a color image. R, G, B filters are symmetrically disposed on the color wheel 105 and the color wheel 105 rotates during formation of a picture. During each rotation of the color wheel 105, only one of the colors is passed, thus, ⅔ of the light is lost. Also, predetermined gaps are formed at the boundaries between the colors of the color wheel 105. Thus, loss of light occurs at the boundaries between the colors of the color wheel 105.

Moreover, since the color wheel 105 mechanically rotates at a high speed, it is noisy and unstable. Also, it is difficult for the color wheel 105 to go faster than a certain speed because of the mechanical limitations of the driving motor. Thus, a color breakup phenomenon occurs. Furthermore, the color wheel 105 is expensive to manufacture.

SUMMARY OF THE INVENTION

Accordingly, it is an object of the present invention to provide an illumination system which is compact and can realize a color image without a color wheel by synthesizing different color light beams emitted from light emitting devices into a single path using a simple structure, and a projection system employing the same.

Additional objects and advantages of the invention will be set forth in part in the description which follows and, in part, will be obvious from the description, or may be learned by practice of the invention.

To achieve the above and other objects of the present invention, there is provided an illumination system including first, second, and third light emitting devices and first and second holograms. The first, second, and third light emitting devices emit light beams having different wavelengths. The first and second holograms are disposed in an "X" configuration at a predetermined angle with respect to the first, second, and third light emitting devices and transmit or reflect incident light depending on the wavelength of the light.

The first, second, and third light emitting devices may have an array structure. The first, second, and third light emitting devices may be LEDs, laser diodes, organic ELCs, or FEDs. Also, the illumination system may further include a collimated light formation unit which collimates beams emitted from the first, second, and third light emitting devices. The collimated light formation unit may be a collimating lens array or a Fresnel lens array.

To achieve the above and other objects of the present invention, there is also provided a projection system employing the illumination system according to the present invention. The projection system includes first, second, and third light emitting devices, first and second holograms, a display device, and a projection lens unit. The first, second, and third light emitting devices emit light beams having different wavelengths. The first and second holograms are disposed in an "X" configuration at a predetermined angle with respect to the first, second, and third light emitting devices and transmit or reflect incident light depending on the wavelength of the light. The display device processes beams incident in one direction via the first and second hologram devices, according to an input image signal, and forms an image. The projection lens unit enlarges and projects the image formed by the display device on a screen.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
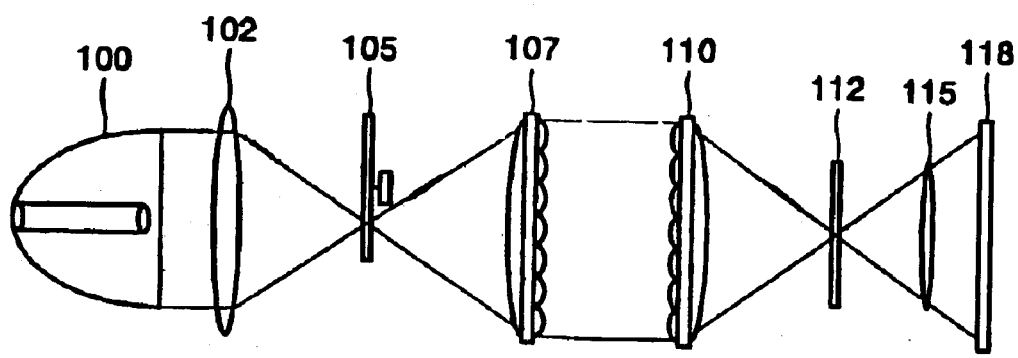
FIG. 1 is a schematic view of a conventional projector.

Reference will now be made in detail to the present preferred embodiments of the present invention, examples of which are illustrated in the accompanying drawings, wherein like reference numerals refer to like elements throughout.

Figure 2:
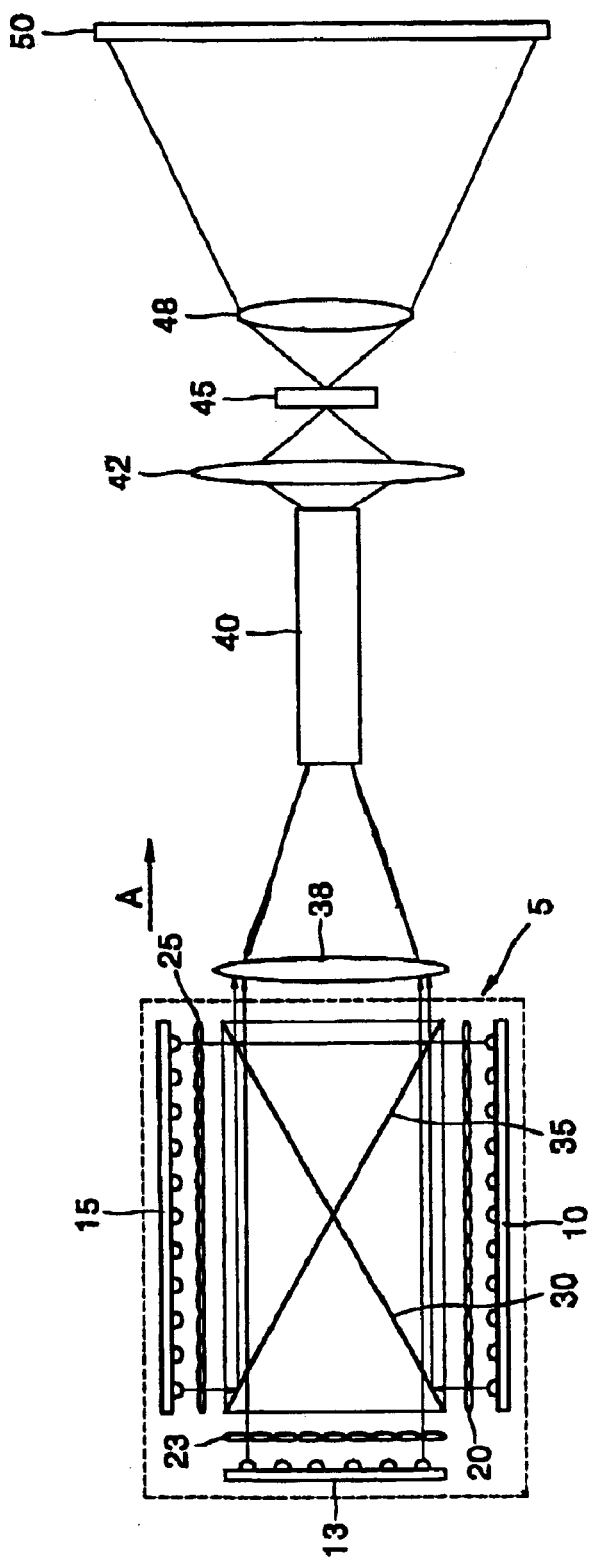
FIG. 2 is a schematic view of an illumination system and a projection system according to an embodiment of the present invention.

Referring to FIG. 2, an illumination system 5 according to the present invention includes first, second, and third light emitting devices 10, 13, and 15, which emit different wavelengths, and first and second hologram devices 30 and 35, which are disposed in an "X" form with respect to the first, second, and third light emitting devices 10, 13, and 15.

The first, second, and third light emitting devices 10, 13, and 15 may be light emitting diodes (LEDs), laser diodes (LDs), organic electroluminescent cells (ELCs), or field emission displays (FEDs). Also, a plurality of the light emitting devices 10, 13, and 15 may be arrayed in a two-dimensional structure to provide greater intensity. The first, second, and third light emitting devices 10, 13, and 15 or light emitting device arrays may emit beams having different wavelengths. For example, the first light emitting device 10 or light emitting device array may emit a red (R) beam, the second light emitting device 13 or light emitting device array may emit a green (G) beam, and the third light emitting device 15 or light emitting device array may emit a blue (B) beam.

The first, second, and third light emitting devices 10, 13, and 15 are disposed as three sides of a rectangle. The first and second hologram devices 30 and 35 are disposed in an X form at a predetermined angle with respect to each of the first, second, and third light emitting devices 10, 13, and 15. The first and second hologram devices 30 and 35 each transmit or reflect only incident light having a predetermined wavelength. For example, the first hologram device 30 may reflect an R beam, but transmit beams of other wavelengths, and the second hologram device 35 may reflect a B beam, but transmit beams of other wavelengths. Thus, the first hologram device 30 reflects the R beam emitted from the first light emitting device 10 in the direction indicated by reference character "A," and the second hologram device 35 reflects the B beam emitted from third light emitting device 15 in the "A" direction. The first and second hologram devices 30 and 35 transmit the G beam emitted from the second light emitting device 13 in the "A" direction. As a result, the first and second hologram devices 30 and 35 allow the R, G, B beams emitted from the first, second, and third light emitting devices 10, 13, and 15 to be emitted along a single path.

Here, the first and second hologram devices 30 and 35 may control angles of reflection of incident beams using a diffraction pattern. Thus, unlike a mirror or a dichroic filter, the angles of arrangement of the first and second holograms 30 and 35 may be controlled. In other words, when the first and second hologram devices 30 and 35 are disposed in the "X" form, their angles of inclination may be controlled. As a result, the cross-sectional area of a beam may be compressed. On the other hand, mirrors or dichroic filters must be maintained at an angle of 45° with respect to an incident beam to reflect the incident beam at an angle of 90°. However, by using a diffraction pattern, the first and second hologram devices 30 and 35 can reflect an incident beam at an angle of 90° even when they are arranged at an angle smaller than 45°. Thus, the first and second hologram devices 30 and 35 are arranged at an angle of inclination smaller than 45° so that the cross-sectional area of the emitted beam is reduced as compared to the incident beam. As a result, the illumination system according to the present invention can be compact in size.

Collimated light formation units 20, 23, and 25, such as collimating lens arrays or Fresnel lens arrays, may also be included to collimate the light beams emitted from the first, second, and third light emitting devices 10, 13, and 15 or light emitting device arrays. The collimated light formation units 20, 23, and 25 are opposite and parallel to the first, second, and third light emitting devices 10, 13, and 15 or light emitting device arrays.

A projection system employing the illumination system according to the present invention will now be described.

As shown in FIG. 2, a projection system according to the present invention includes the first, second, and third light emitting devices 10,13, and 15, the first and second hologram devices 30 and 35, a display device 45, and a projection lens unit 48. The first, second, and third light emitting devices 10, 13, and 15 emit beams having different wavelengths. The first and second hologram devices 30 and 35 are disposed in an "X" form with respect to the first, second, and third light emitting devices 10, 13, and 15. The display device 45 processes beams having predetermined wavelengths, which are incident along the same path via the first and second hologram devices 30 and 35, based on an input image signal, and forms an image. The projection lens unit 48 enlarges and projects the image displayed by the display device 45 on a screen 50.

As described previously, the first, second, and third light emitting devices 10, 13, and 15 are light sources to emit beams having different wavelengths. The first, second, and third light emitting devices 10, 13, and 15 may be LEDs, LDs, organic ELCs, or FEDs. A parallel light formation unit such as a collimating lens array or a Fresnel lens array, may further be prepared to collimate the beams emitted from the first, second, and third light emitting devices 10, 13, and 15.

The first and second hologram devices 30 and 35 selectively transmit or reflect each of the three color beams emitted from different directions and process the beams in the same direction. A beam incident on the display device 45 is switched on/off on a pixel-by-pixel basis according to an input signal to form an image. The display device 45 may be a moveable mirror device or a liquid crystal display (LCD). The moveable mirror device realizes a color image due to an on-off switching operation of a micromirror according to an image signal. The LCD realizes a color image by polarizing and modulating an incident light beam.

A uniform light formation unit 40 such as an integrating rod or a fly eye lens is further disposed to make uniform the strength of the light beam on a light path between the first and second hologram devices 30 and 35 and the display device 45. A first relay lens 38 and a second relay lens 42 may also be included. The first relay lens 38 condenses the uniform light emitted from the first and second hologram devices 30 and 35 through the uniform light formation unit 40. The second relay lens 42 condenses the uniform beams emitted from the uniform light formation unit 40 toward the display device 45.

The first, second, and third light emitting devices 10, 13, and 15 or the light emitting device arrays sequentially emit the R, G, B beams, respectively. Next, the R, G, B beams emitted from different directions move along the same path due to the first and second hologram devices 30 and 35. Here, the cross-sectional area of the beams emitted through the first and second hologram devices 30 and 35 may be more compressed than the beams emitted from the first, second, and third light emitting devices 10, 13, and 15 by controlling angles of inclination of the first and second hologram devices 30 and 35. Thus, the size of the illumination system 5 can be reduced and the projection system can be compact.

The beam synthesized into a single path via the first and second hologram devices 30 and 35 passes through the first relay lens 38, the uniform light formation unit 40, and the second relay lens 42, and is incident in a uniform state on the display device 45. Next, the beam is switched on /off by the display device 45 on a pixel-by-pixel basis according to an image signal, to form a color image. The formed color image is enlarged by the projection lens unit 48 and projected onto the screen 50.

An illumination system according to the present invention provides light emitting devices to emit light having a narrow spectrum in a desired wavelength range or a color gamut having improved color purity and a wider distribution using light emitting arrays. Also, the cross-sectional area of a beam can be compressed by a simple structure using hologram devices and beams emitted from different directions. Thus, the illumination system can be compact-sized and loss of light can be reduced. Moreover, the illumination system uses light emitting devices or light emitting device arrays. Thus, a small amount of heat is generated as compared to conventional lamp light sources and the lifespan of the illumination system is prolonged.

Furthermore, in a projection system employing an illumination system according to the present invention, time sequential driving is possible due to the illumination system having the light emitting devices or the light emitting device arrays. Thus, a color wheel is unnecessary and the problem of noise caused by the motor to drive the color wheel is solved. Also, since on/off switching can be performed faster than the color wheel is capable of rotating, a high frame rate can be realized and power consumption can be reduced. Thus, the projection system employing the illumination system according to the present invention provides a high-density and high-quality image.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An illumination system comprising:
   first, second, and third light emitting devices which emit light beams having different wavelengths; and
   first and second hologram devices which are disposed in an "X" configuration at an angle with respect to the first, second, and third light emitting devices to transmit or reflect light beams incident from the first, second and third light emitting devices depending on the wavelength of the light beams.

2. The illumination system of claim 1, wherein the first, second, and third light emitting devices have an array structure.

3. The illumination system of claim 2, wherein the first, second, and third light emitting devices are LEDs, laser diodes, organic ELCs, or FEDs.

4. The illumination system of claim 3, further comprising a collimated light formation unit to collimate the light beams emitted from the first, second, and third light emitting devices.

5. The illumination system of claim 4, wherein the collimated light formation unit is a collimating lens array or Fresnel lens array.

6. A projection system comprising:
   first, second, and third light emitting devices which emit light beams having different wavelengths;
   first and second hologram devices which are disposed In an "X" configuration at an angle with respect to the first, second, and third light emitting devices to transmit or reflect light beams incident from the first, second and third light emitting devices depending on the wavelength of the light beams;
   a display device which processes light beams incident thereon in one direction from the first and second hologram devices, according to an input image signal, and to form an image;
   a screen; and
   a projection lens unit which enlarges and projects the image formed by the display device on the screen.

7. The projection system of claim 6, wherein the first, second, and third light emitting devices have an array structure.

8. The projection system of claim 7, wherein the first, second, and third light emitting devices are LEDs, laser diodes, organic ELCs, or FEDs.

9. The projection system of claim 8, further comprising a collimated light formation unit to collimate the light beams emitted from the first, second, and third light emitting devices.

10. The projection system of claim 9, wherein the collimated light formation unit is a collimating lens array or Fresnel lens array.

11. The projection system of claim 9, further comprising a uniform light formation unit which makes uniform an intensity of the light beams emitted from the first and second hologram devices.

12. The projection system of claim 11, wherein the uniform light formation unit is an integrating rod or a fly eye lens.

13. The projection system of claim 12, further comprising a relay lens, to condense light beams incident thereon from the first and second hologram devices, or incident thereon from the uniform light formation unit, to a predetermined position.

14. An illumination system comprising:
   first and second light emitting devices to emit light beams having different wavelengths; and
   first and second hologram devices to transmit or reflect the light beams emitted by the first and second light emitting devices and incident thereon depending on the wavelengths of the incident light beams, the first and second hologram devices being arranged with respect to each other at an angle of inclination.

15. The illumination system as claimed in claim 14, further comprising a third light emitting device to emit a light beams having a wavelength different from the wavelengths of the light beams emitted from the first and second light emitting devices.

16. An illumination system comprising:
   first and second light emitting devices to emit light beams having different wavelengths; and
   first and second optical devices to transmit or reflect the light beams emitted by the first and second light emitting devices and incident thereon depending on the wavelengths of the incident light beams, the first and second optical devices being arranged with respect to each other at an angle of inclination,
   wherein the angle of inclination of the first and second optical devices may be controlled to reduce a cross-sectional area of the incident light beams,
   and the first and second optical devices are hologram devices.

17. The illumination system as claimed in claim 16, wherein the angle of inclination of the first and second hologram devices is less than 45°.

18. The illumination system as claimed in claim 17, wherein an angle of reflection of the incident light beams is 90°.

19. The illumination system as claimed in claim 18, wherein the angle of reflection of the incident light beams is controlled by a diffraction pattern of the first and second hologram devices.

20. The illumination system as claimed in claim 14, wherein the first and second hologram devices transmit the incident light beams along a single path.

21. The illumination system as claimed in claim 14, wherein the hologram devices are arranged in an "X" configuration.

22. A projection system comprising:
   first and second light emitting devices to emit light beams having different wavelengths; and
   first and second hologram devices to transmit or reflect the light beams emitted by the first and second light emitting devices and incident thereon depending on the wavelengths of the incident light beams, the first and second hologram devices being arranged with respect to each other at an angle of inclination;
   a display device to process the light beams incident thereon from the first and second hologram devices according to an input image signal, and to form an image;
   a screen; and
   a projector to project the image formed by the display device on the screen.

23. An illumination system comprising:
   first and second light emitting devices to emit light beams having different wavelengths; and
   first and second optical devices to transmit or reflect the light beams emitted by the first and second light emitting devices and incident thereon depending on the wavelengths of the incident light beams, the first and second optical devices being arranged with respect to each other at an angle of inclination,
   wherein the first and second optical devices each comprises a diffraction pattern.

24. An illumination system comprising:
   first and second light emitting devices to emit light beams having different wavelengths; and
   first and second hologram devices to transmit or reflect the light beams emitted by the first and second light emitting devices and incident thereon depending on the wavelengths of the incident light beams, the first and second hologram devices being arranged with respect to each other at an angle of inclination,
   wherein a cross-sectional area of the light beams transmitted or reflected through the first and second hologram devices is more compressed than a cross-sectional area of the light beams emitted by the first and second light emitting devices.

* * * * *

UNITED STATES PATENT AND TRADEMARK OFFICE
CERTIFICATE OF CORRECTION

PATENT NO. : 6,918,682 B2
DATED : July 19, 2005
INVENTOR(S) : Sung-ha Kim et al.

It is certified that error appears in the above-identified patent and that said Letters Patent is hereby corrected as shown below:

Column 5,
Line 57, change "In" to -- in --.

Signed and Sealed this

Fourteenth Day of March, 2006

JON W. DUDAS
*Director of the United States Patent and Trademark Office*